United States Patent
Butterfield

(10) Patent No.: US 12,453,331 B1
(45) Date of Patent: Oct. 28, 2025

(54) LITTER BOX LIFT DEVICE

(71) Applicant: Donna Butterfield, Loves Park, IL (US)

(72) Inventor: Donna Butterfield, Loves Park, IL (US)

( * ) Notice: Subject to any disclaimer, the term of this patent is extended or adjusted under 35 U.S.C. 154(b) by 44 days.

(21) Appl. No.: 18/650,333

(22) Filed: Apr. 30, 2024

(51) Int. Cl.
*A01K 1/01* (2006.01)
(52) U.S. Cl.
CPC ................................. *A01K 1/011* (2013.01)
(58) Field of Classification Search
CPC ...................................................... A01K 1/011
USPC .............................. 248/188.2; 119/163, 161
See application file for complete search history.

(56) References Cited

U.S. PATENT DOCUMENTS

| | | | | |
|---|---|---|---|---|
| RE32,052 E | * | 12/1985 | Rosenberg | ............... A61D 3/00 119/756 |
| 6,230,657 B1 | * | 5/2001 | Read | ...................... A01K 13/00 119/28.5 |
| 7,487,743 B1 | * | 2/2009 | Lane | .................... A01K 1/0114 209/373 |
| 7,757,637 B1 | | 7/2010 | Debien | |
| 7,913,652 B1 | * | 3/2011 | Lutz | ..................... A01K 13/001 119/674 |
| 8,104,725 B1 | | 1/2012 | Kebre | |
| 9,163,777 B1 | | 10/2015 | Knecht | |
| 10,064,383 B1 | | 9/2018 | Valdespee | |
| D930,292 S | | 9/2021 | Amicarelli | |
| 11,968,955 B2 | * | 4/2024 | Magee | ................... A01K 1/011 |
| 2016/0375919 A1 | | 12/2016 | Wright | |
| 2021/0084861 A1 | * | 3/2021 | Steinbach | .............. F16M 11/38 |
| 2022/0125006 A1 | | 4/2022 | Smith | |

FOREIGN PATENT DOCUMENTS

EP    3251500    12/2017

\* cited by examiner

*Primary Examiner* — Anita M King

(57) ABSTRACT

A litter box lift device for raising and lowering a litter box includes an enclosure having a base wall, a back wall, and a pair of side walls. The back wall has a back wall upper edge and each side wall of the pair of side walls has a respective side wall upper edge. The back wall upper edge and the respective side wall upper edges define a top opening into the enclosure. A platform is selectively positionable between a lowered position and a raised position. The platform is positioned against the base wall in the lowered position. The platform is positioned proximate to the top opening in the raised position. A drive assembly moves the platform between the lowered position and the raised position. A guide inhibits the platform from pivoting as the platform moves between the lowered position and the raised position.

19 Claims, 8 Drawing Sheets

LITTER BOX LIFT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to litter box accessories and more particularly pertains to a new litter box accessory for raising and lowering a litter box.

(2) Description of Related Art Including Information Disclosed Under 37 CFR 1.97 and 1.98

The prior art relates to litter box accessories. Litter boxes require a significant amount of maintenance. In most situations, litter boxes need to be cleaned and refilled daily. Pet owners typically store litter boxes on the ground. While storage on the ground allows the pets to easily access the litter boxes, it also makes the litter boxes harder for the pet owners to reach for maintenance. For example, the pet owners need to bend over and pick up the litter box or kneel down to clean out the litter box. This can be annoying and, for individuals with injuries, disabilities, or otherwise limited mobility, it can be difficult and painful. Thus, there is a need for a device that can selectively raise and lower the litter box. Such a device would ideally raise the litter box to a position near the waist of the pet owner, so that the pet owner can stand next to the device while cleaning or refilling the litter box.

BRIEF SUMMARY OF THE INVENTION

An embodiment of the disclosure meets the needs presented above by generally comprising an enclosure including a base wall. A back wall is coupled to and extends upwardly from the base wall. The back wall has a back wall upper edge that is distally positioned relative to the base wall. A pair of side walls is coupled to and extends upwardly from the base wall. The pair of side walls is coupled to and extend forwardly from the back wall. Each side wall of the pair of side walls has a respective side wall upper edge that is that is positioned relative to the base wall. The back wall upper edge and the respective side wall upper edge of each side wall of the pair of side walls define a top opening into the enclosure.

A platform is movably coupled to the enclosure. The platform is selectively positionable between a lowered position and a raised position. The platform is positioned against the base wall when the platform is in the lowered position. The platform is positioned proximate to the top opening when the platform is in the raised position. A drive assembly is coupled to the platform. The drive assembly is actuatable to move the platform between the lowered position and the raised position.

A guide is coupled to the enclosure. The platform is movably coupled to the guide wherein the guide inhibits the platform from being pivoted as the platform moves between the lowered position and the raised position. The guide includes a plurality of fingers extending from the platform toward the enclosure and a plurality of channels extending into an inner surface of the enclosure. The plurality of channels is aligned with the plurality of fingers wherein each finger of the plurality of fingers is positioned within a respective channel of the plurality of channels. The plurality of fingers move along the plurality of channels as the platform moves between the raised position and the lowered position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
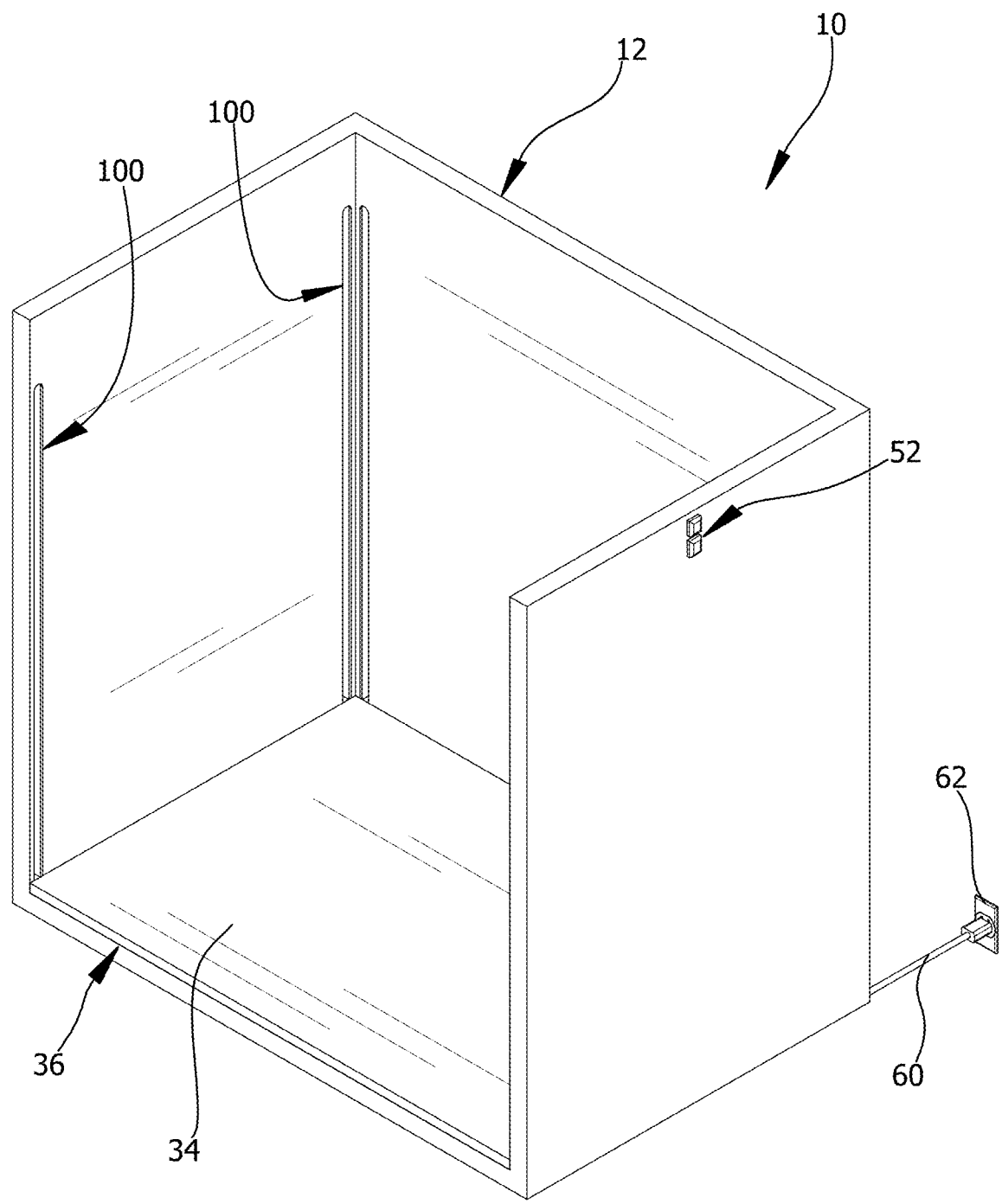
FIG. 1 is a top right perspective view of a litter box lift device according to an embodiment of the disclosure.

With reference now to the drawings, and in particular to FIGS. 1 through 8 thereof, a new litter box accessory embodying the principles and concepts of an embodiment of the disclosure and generally designated by the reference numeral 10 will be described.

As best illustrated in FIGS. 1 through 8, the litter box lift device 10 generally comprises an enclosure 12. The enclosure 12 may include a base wall 14. The base wall 14 may be planar. The base wall 14 may be rectangular, as shown in the Figures, although alternative shapes of the base wall 14 and the enclosure 12 are also contemplated. The base wall 14 generally includes a base wall forward edge 16.

A back wall 18 is generally coupled to and extends upwardly from the base wall 14. The back wall 18 is generally distally positioned on the base wall 14 relative to the base wall forward edge 16. The back wall 18 may be perpendicular to the base wall 14. The back wall 18 may be planar. The back wall 18 may be rectangular, although alternative shapes are also contemplated. The back wall 18 generally includes a back wall upper edge 20 that is distally positioned relative to the base wall 14.

A pair of side walls 22 is generally coupled to and extends upwardly from the base wall 14. For example, the pair of side walls 22 may be perpendicular to the base wall 14. The pair of side walls 22 is generally coupled to and extends forwardly from the back wall 18. For example, the pair of side walls 22 may be perpendicular to the back wall 18. Each side wall of the pair of side walls 22 may be planar. Each side wall of the pair of side walls 22 may be rectangular, although alternative shapes are also contemplated.

The pair of side walls 22 may include a pair of side wall forward edges 24. Each side wall of the pair of side walls 22 has a respective side wall forward edge of the pair of side wall forward edges 24. The pair of side wall forward edges 24 is generally distally positioned relative to the back wall 18. The pair of side wall forward edges 24 may be coplanar with the base wall forward edge 16. The pair of side wall forward edges 24 and the base wall forward edge 16 generally define a front opening 26 into the enclosure 12. The front opening 26 is configured to facilitate access to an inner area 28 of the enclosure 12. The inner area 28 is defined by the base wall 14, the back wall 18, and the pair of side walls 22.

The pair of side walls 22 may further include a pair of side wall upper edges 30. Each side wall of the pair of side walls 22 has a respective side wall upper edge of the pair of side wall upper edges 30. The pair of side wall upper edges 30 is generally distally positioned relative to the base wall 14. The pair of side wall upper edges 30 may be coplanar with the back wall upper edge 20. The back wall upper edge 20 and the pair of side wall upper edges 30 define a top opening 32 into the enclosure 12. The top opening 32 is configured to facilitate access to the inner area 28 of the enclosure 12.

Figure 7:
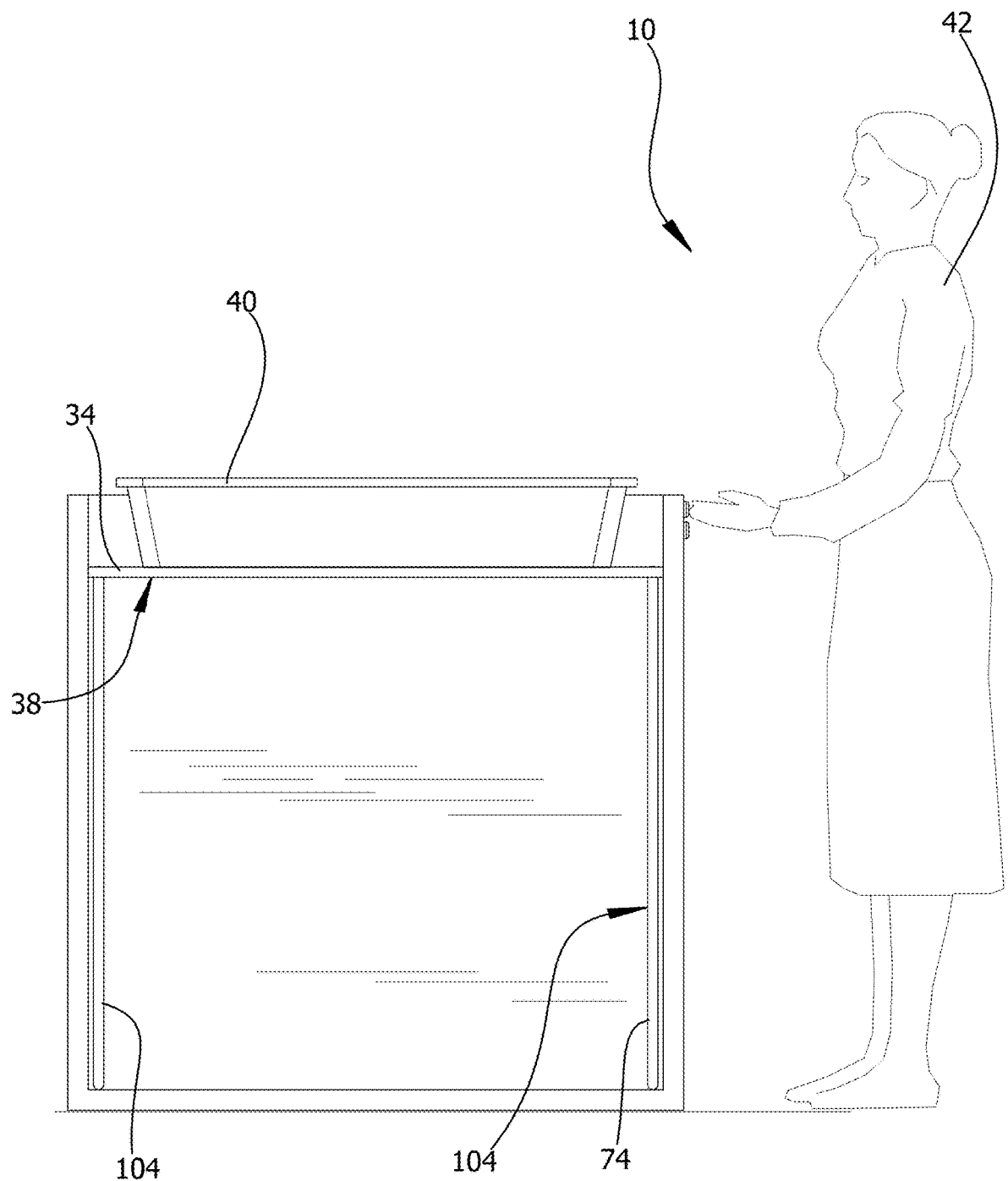
FIG. 7 is an in-use view of an embodiment of the disclosure.
Figure 8:
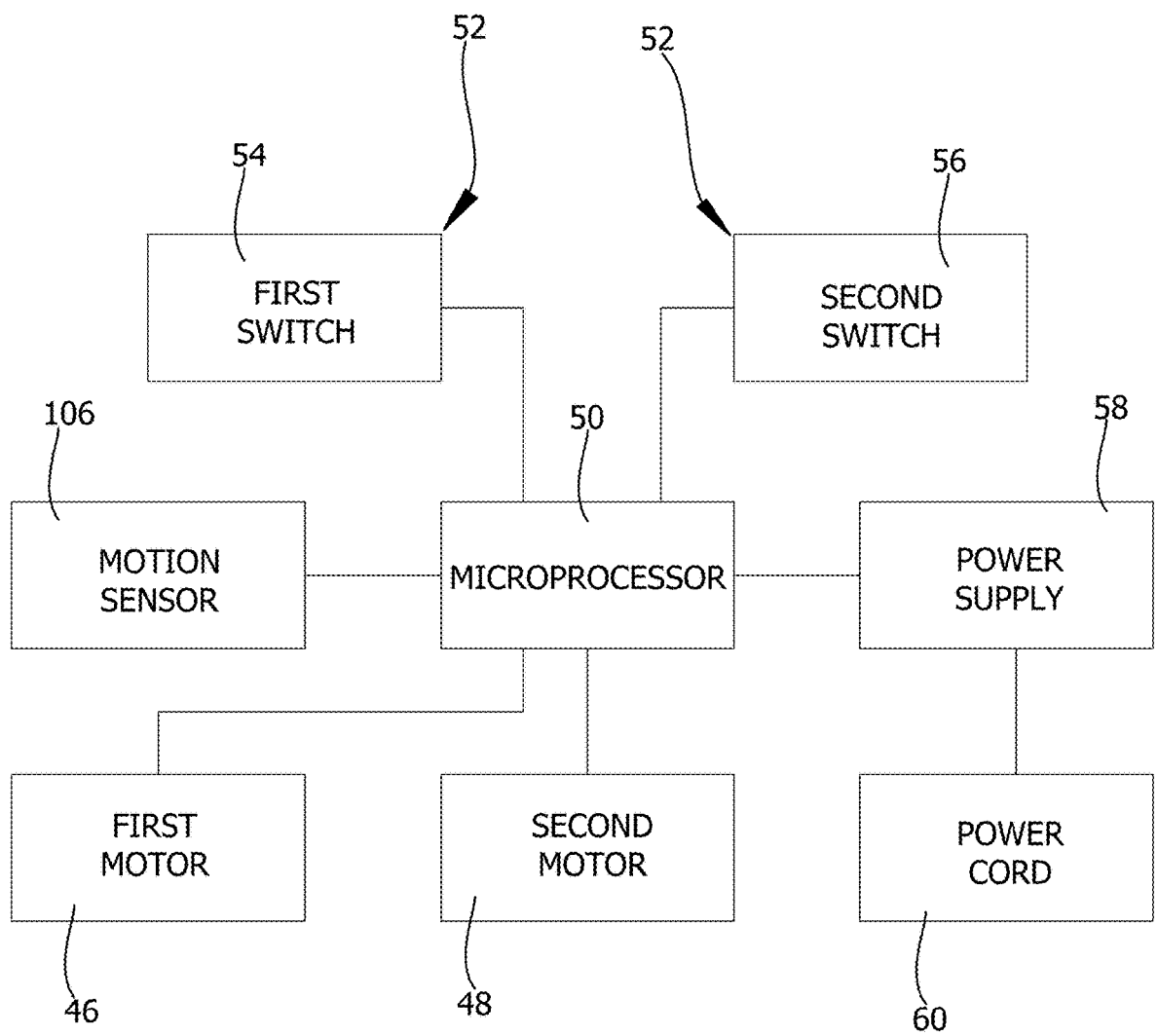
FIG. 8 is a block diagram view of an embodiment of the disclosure.

Embodiments of the enclosure 12 are generally sized to complement a height of a user 42. For example, the top opening 32 may be positioned proximate to a waist of the user 42 as shown in FIG. 7. A length between the pair of side wall forward edges 24 may be between 20.0 inches and 40.0 inches. A height between the base wall 14 and the back wall upper edge 20 may be between 20.0 inches and 40.0 inches. A width between the base wall forward edge 16 and the back wall 18 may be between 10.0 inches and 30.0 inches.

A platform 34 is movably coupled to the enclosure 12. The platform 34 is selectively positionable between a lowered position 36 and a raised position 38. The platform 34 is generally positioned against the base wall 14 when the platform 34 is in the lowered position 36. The platform 34 is generally positioned proximate to the top opening 32 when the platform 34 is in the raised position 38. The platform 34 may be planar. The platform 34 is configured to support an object, such as a litter box 40, as shown in FIG. 7. The platform 34 is configured to selectively position the litter box 40 proximate to the waist of the user 42 when the platform 34 is in the raised position 38. The platform 34 is thus configured to facilitate the user 42 in accessing the litter box 40 through the top opening 32, for example to clean the litter box 40.

The platform 34 may be rectangular, although alternative shapes are also contemplated. For example, the platform 34 may have a shape that is complementary to a shape of the base wall 14 wherein the platform 34 is coextensive with the base wall 14. The platform 34 may cover the base wall 14 when the platform 34 is in the lowered position 36. The platform 34 may inhibit access to the inner area 28 of the enclosure 12 through the top opening 32 when the platform 34 is in the raised position 38.

A drive assembly 44 is coupled to the platform 34. The drive assembly 44 is actuatable to move the platform 34 between the lowered position 36 and the raised position 38.

For example, the drive assembly 44 may include a first motor 46 and a second motor 48. The second motor 48 is generally spaced from the first motor 46. For example, the first motor 46 may be coupled to a first side wall 108 of the pair of side walls 22. The first motor 46 may be positioned within the first side wall 108. The first motor 46 may be positioned proximate to the respective side wall forward edge 24 of the first side wall 108 wherein the first motor 46 is positioned proximate to the front opening 26. The first motor 46 may be spaced from the base wall 14 wherein the first motor 46 is positioned proximate to the top opening 32.

The second motor 48 is configured to facilitate the first motor 46 in moving the platform 34 between the lowered position 36 and the raised position 38. For example, the second motor 48 may be coupled to a second side wall 110 of the pair of side walls 22. The second motor 48 may be positioned within the second side wall 110. The second motor 48 may be positioned proximate to the back wall 18 wherein the second motor 48 is spaced from the front opening 26. The second motor 48 may be spaced from the base wall 14 wherein the second motor 48 is positioned proximate to the top opening 32.

Figure 5:
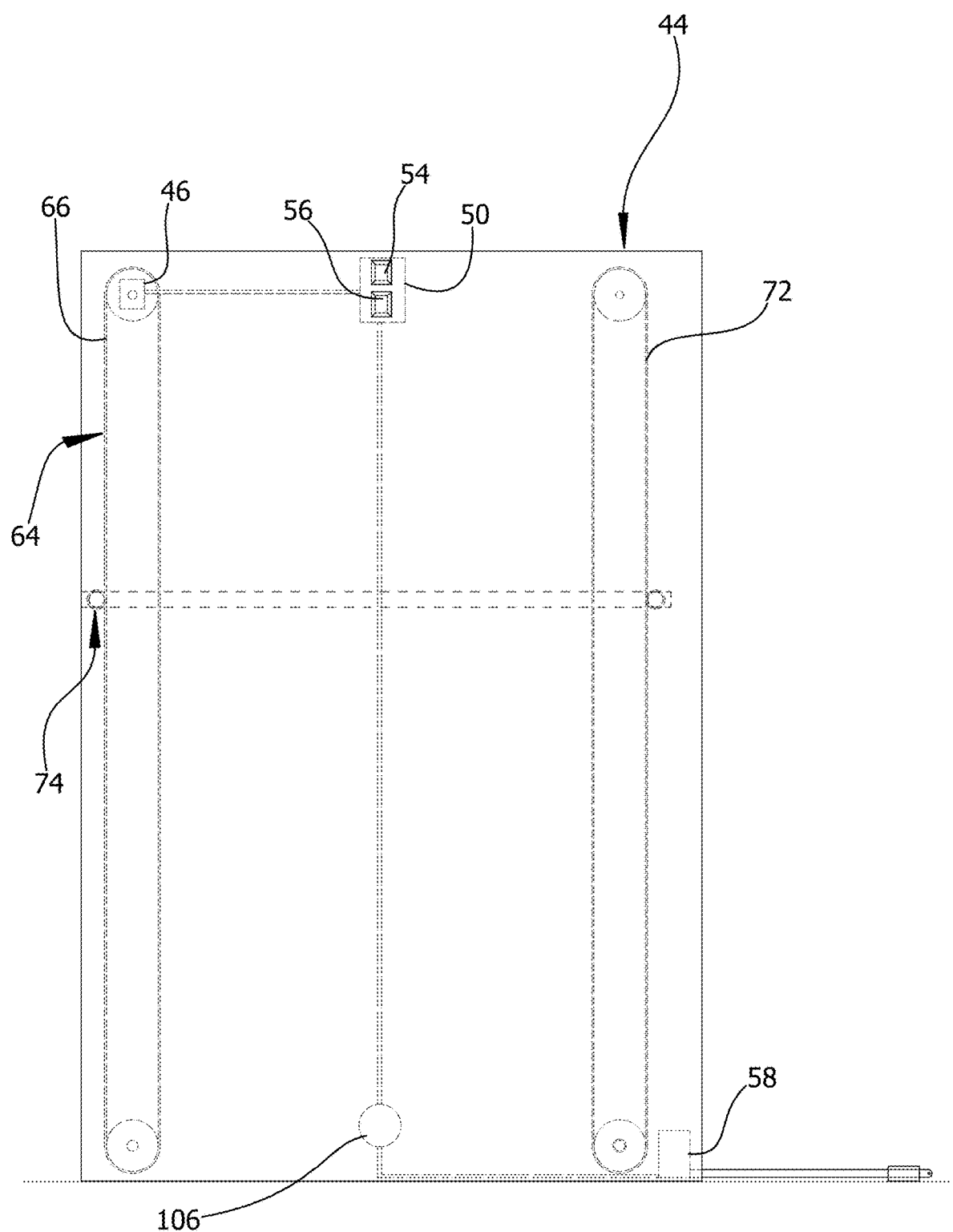
FIG. 5 is a right side view of an embodiment of the disclosure.
Figure 6:
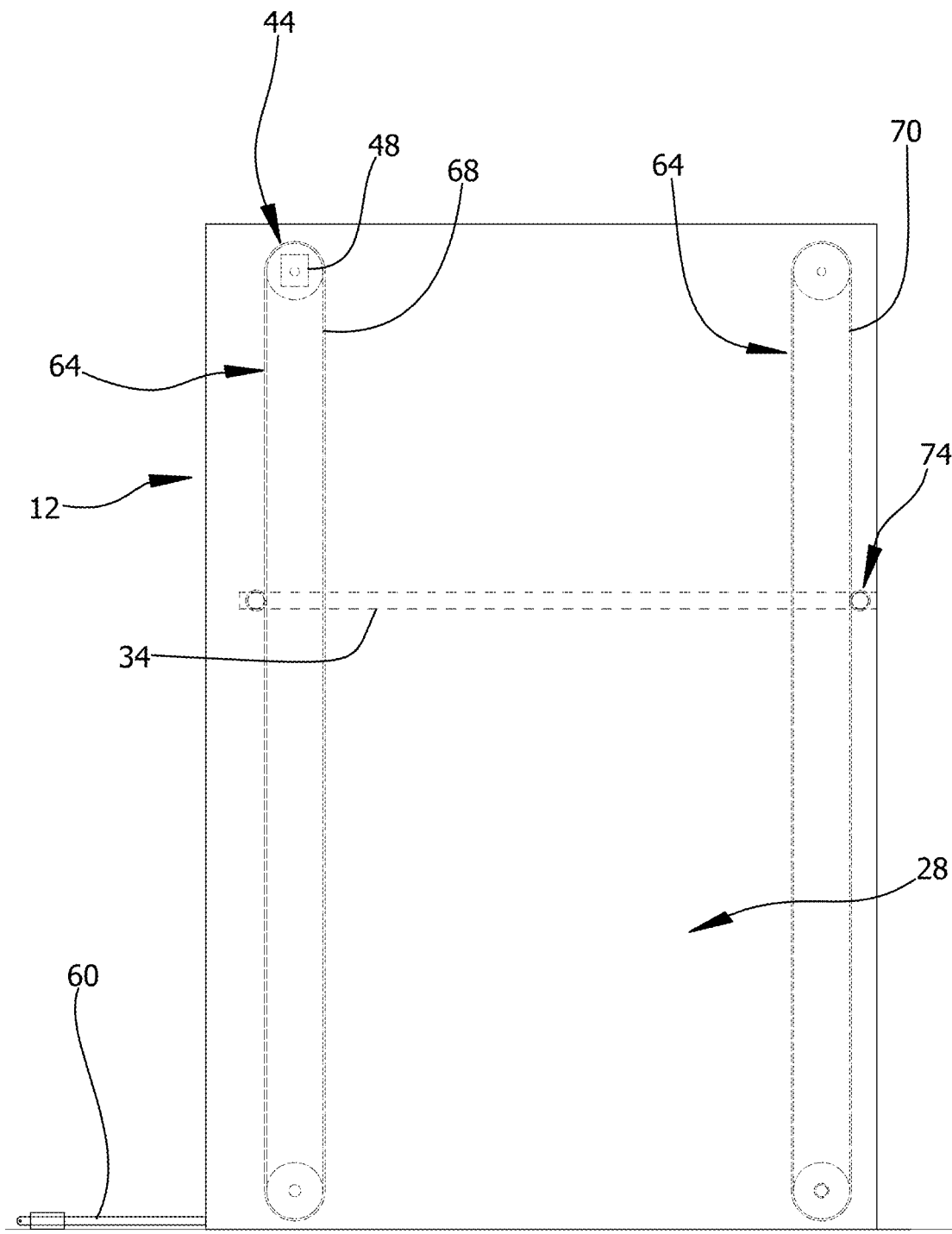
FIG. 6 is a left side view of an embodiment of the disclosure.

A processor 50 is electrically coupled to each of the first motor 46 and the second motor 48. The processor 50 is actuatable to actuate each of the first motor 46 and the second motor 48. Generally, the processor 50 actuates the first motor 46 and the second motor 48 simultaneously. As shown in FIG. 5, the processor 50 may be positioned within one of the pair of side walls 22, such as the second side wall 110.

A control panel 52 may be electrically coupled to the processor 50. The control panel 52 is actuatable to signal the processor 50 to actuate each of the first motor 46 and the second motor 48. The control panel 52 is generally coupled to the enclosure 12. The control panel 52 may include an up button 54 and a down button 56.

The up button 54 is actuatable to move the platform 34 upwards toward the raised position 38. The up button 54 may be positioned on an outer surface 112 of the enclosure 12, for example on the second side wall 110 of the pair of side walls 22, as shown in FIG. 1. The up button 54 may be positioned proximate to the respective side wall upper edge of the second side wall 110, wherein the up button 54 is configured to be within reach of the user 42 when the user is standing up. In such embodiments, the user 42 does not need to bend over to actuate the drive assembly 44 and adjust the position of the platform 34. The up button 54 may be spaced from the back wall 18. The up button 54 may be spaced from the respective side wall forward edge of the pair of side wall forward edges 24.

The down button 56 is actuatable to move the platform 34 downwards toward the lowered position 36. The down button 56 may be positioned beneath the up button 54. The down button 56 may be aligned with the up button 54.

An internal power source 58 may be electrically coupled to the processor 50. The internal power source 58 may comprise a battery. The internal power source 58 may be electrically coupled to a power input 60. In some embodiments, the power input 60 may be removably couplable to the internal power source 58, for example through a charging port exposed within the enclosure 12. The power input 60 is generally configured to be electrically couplable to an extrinsic power source 62. The power input 60 is configured to transfer power from the extrinsic power source 62 to the internal power source 58. The power input 60 may be a power cord that extends from the back wall 18 of the enclosure 12. The power cord may be positioned proximate to the base wall 14. The power cord may be positioned proximate to the second side wall 110.

A plurality of pulleys 64 may be coupled to the first motor 46 and the second motor 48. The plurality of pulleys 64 may be coupled to the platform 34. The first motor 46 and the second motor 48 move the plurality of pulleys 64 to move the platform 34 between the lowered position 36 and the raised position 38.

The plurality of pulleys 64 may include a first pulley 66 that is positioned within the first side wall 108, for example proximate to the front opening 26 and the first motor 46. The first motor 46 may be operably coupled to the first pulley 66 wherein the first motor 46 moves the first pulley 66. A second pulley 68 may be spaced from the first pulley 66 and coupled to the second motor 48, wherein the second motor 48 moves the second pulley 68. For example, the second pulley 68 may be positioned within the second side wall 110 proximate to the back wall 18.

In some embodiments, a third pulley 70 may be positioned within the second side wall 110 and spaced from the second pulley 68. For example, the third pulley 70 may be positioned proximate to the front opening 26. The third pulley 70 may be coupled to the second motor 48, wherein the second motor 48 moves the third pulley 70. Such embodiments may further include a fourth pulley 72 that is coupled to the first motor 46 wherein the first motor 46 moves the fourth pulley 72. The fourth pulley 72 is generally spaced from the first pulley 66. For example, the fourth pulley 72 may be positioned within the first side wall 108 proximate to the back wall 18.

A guide 74 may be coupled to the enclosure 12. The platform 34 is movably coupled to the guide 74 wherein the guide 74 inhibits the platform 34 from being pivoted as the platform 34 moves between the lowered position 36 and the raised position 38. For example, the guide 74 may inhibit the platform 34 from tilting toward one of the back wall 18 and the pair of side walls 22 as the platform 34 moves between the lowered position 36 and the raised position 38. The platform 34 holds the litter box 40, and the guide 74 keeps the platform 34 and the litter box 40 level to inhibit the litter box 40 from sliding around on the platform 34, or from sliding off the platform 34, or from spilling onto the platform 34. The guide 74 may further inhibit the platform 34 from rotating or spinning within the enclosure 12, to stabilize a position of the litter box 40 on the platform 34.

The guide 74 may include a plurality of fingers 76 extending from the platform 34 toward the enclosure 12. The plurality of fingers 76 may be coplanar with each other. A plurality of channels 96 may extend into an inner surface 114 of the enclosure 12. The plurality of channels 96 is aligned with the plurality of fingers 76 wherein each finger of the plurality of fingers 76 is positioned within a respective channel of the plurality of channels 96. Each finger of the plurality of fingers 76 moves or slides along the respective channel of the plurality of channels 96 as the platform 34 moves between the raised position 38 and the lowered position 36.

A pair of side fingers may extend toward a side wall of the pair of side walls 22. For example, a pair of first side fingers 78 may extend toward the first side wall 108 of the pair of side walls 22. A pair of second side fingers 84 may extend toward the second side wall 110 of the pair of side walls 22. Some embodiments may include both the pair of first side fingers 78 and the pair of second side fingers 84. Other embodiments may include one of the pair of first side fingers 78 and the pair of second side fingers 84.

The pair of first side fingers 78 may be spaced from each other. For example, a primary first side finger 80 of the pair of first side fingers 78 may be positioned proximate to the respective forward edge of the first side wall 108. A secondary first side finger 82 of the pair of first side fingers 78 may be positioned proximate to the back wall 18.

The pair of second side fingers 84 may be aligned with the pair of first side fingers 78 across the platform 34. For example, a primary second side finger 86 of the pair of second side fingers 84 may be positioned proximate to the respective forward edge of the second side wall 110. A secondary second side finger 88 of the pair of second side fingers 84 may be positioned proximate to the back wall 18. The pair of second side fingers 84 may be parallel to the pair of first side fingers 78.

A pair of back fingers 90 may extend toward the back wall 18. The pair of back fingers 90 may be spaced from each other. For example, a primary back finger 92 of the pair of back fingers 90 may be positioned proximate to the first side wall 108. A secondary back finger 94 of the pair of back fingers 90 may be positioned proximate to the second side wall 110. The pair of back fingers 90 may be coplanar with the pair of first side fingers 78 and the pair of second side fingers 84. The pair of back fingers 90 may be perpendicular to the pair of first side fingers 78 and the pair of second side fingers 84.

The plurality of channels 96 may have a uniform length wherein each channel of the plurality of channels 96 has a respective top end 98, and each respective top end 98 may be aligned with the other respective top ends 98 of the other channels of the plurality of channels 96. The respective top end 98 of each channel of the plurality of channels 96 is generally positioned proximate to the top opening 32, such that the platform 34 can be positioned proximate to the top opening 32 when the platform 34 is in the raised position 38. The respective top end 98 of each channel of the plurality of channels 96 may be spaced from the top opening 32 wherein the plurality of channels 96 is configured to inhibit the platform 34 from being removed from the enclosure 12 through the top opening 32.

The number and positioning of the plurality of channels 96 generally corresponds to the number and positioning of the plurality of fingers 76. For example, a pair of first side channels 100 may extend into the first side wall 108. A pair of second side channels 102 may extend into the second side wall 110. A pair of back channels 104 may extending into the back wall 18.

Figure 2:
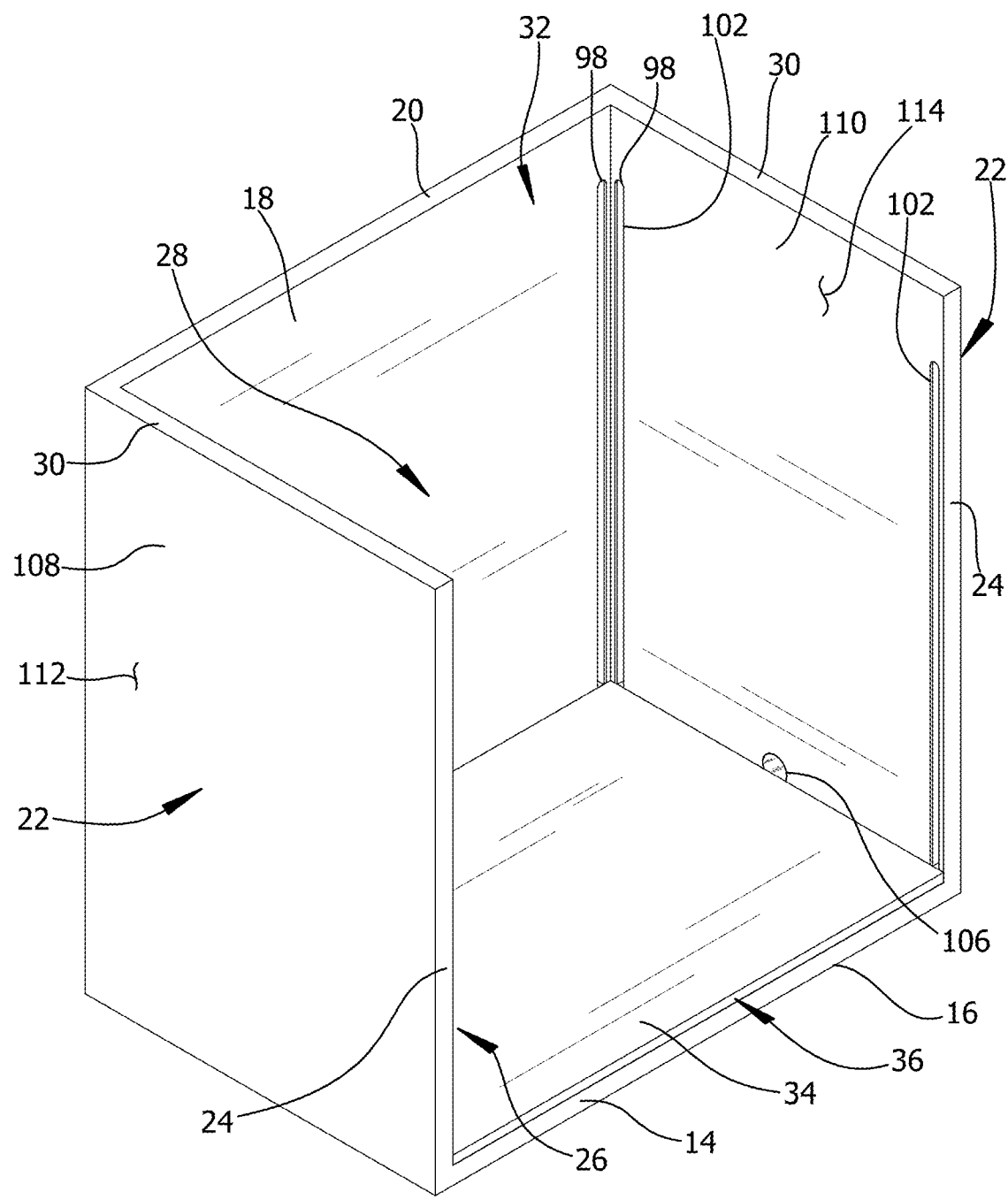
FIG. 2 is a top left perspective view of an embodiment of the disclosure.

A motion sensor 106 may be electrically coupled to the processor 50. The motion sensor 106 is configured to detect movement beneath the platform 34 when the platform 34 is raised from the lowered position 36. The processor 50 may be configured to inhibit the platform 34 from moving downwardly toward the base wall 14 when the motion sensor 106 detects movement beneath the platform 34. The motion sensor 106 is configured to inhibit the platform 34 from injuring the user 42, or a pet of the user 42, such as a cat that uses the litter box 40. For example, the pet may climb into the inner area 28 of the enclosure 12 while the platform 34 is in the raised position 38 without being noticed by the user 42. The motion sensor 106 may be positioned within a side wall of the pair of side walls 22, for example the second side wall 110 as shown in FIG. 2. The motion sensor 106 may be positioned adjacent to the base wall 14. The motion sensor 106 may be spaced from the front opening 26 and from the back wall 18.

Figure 3:
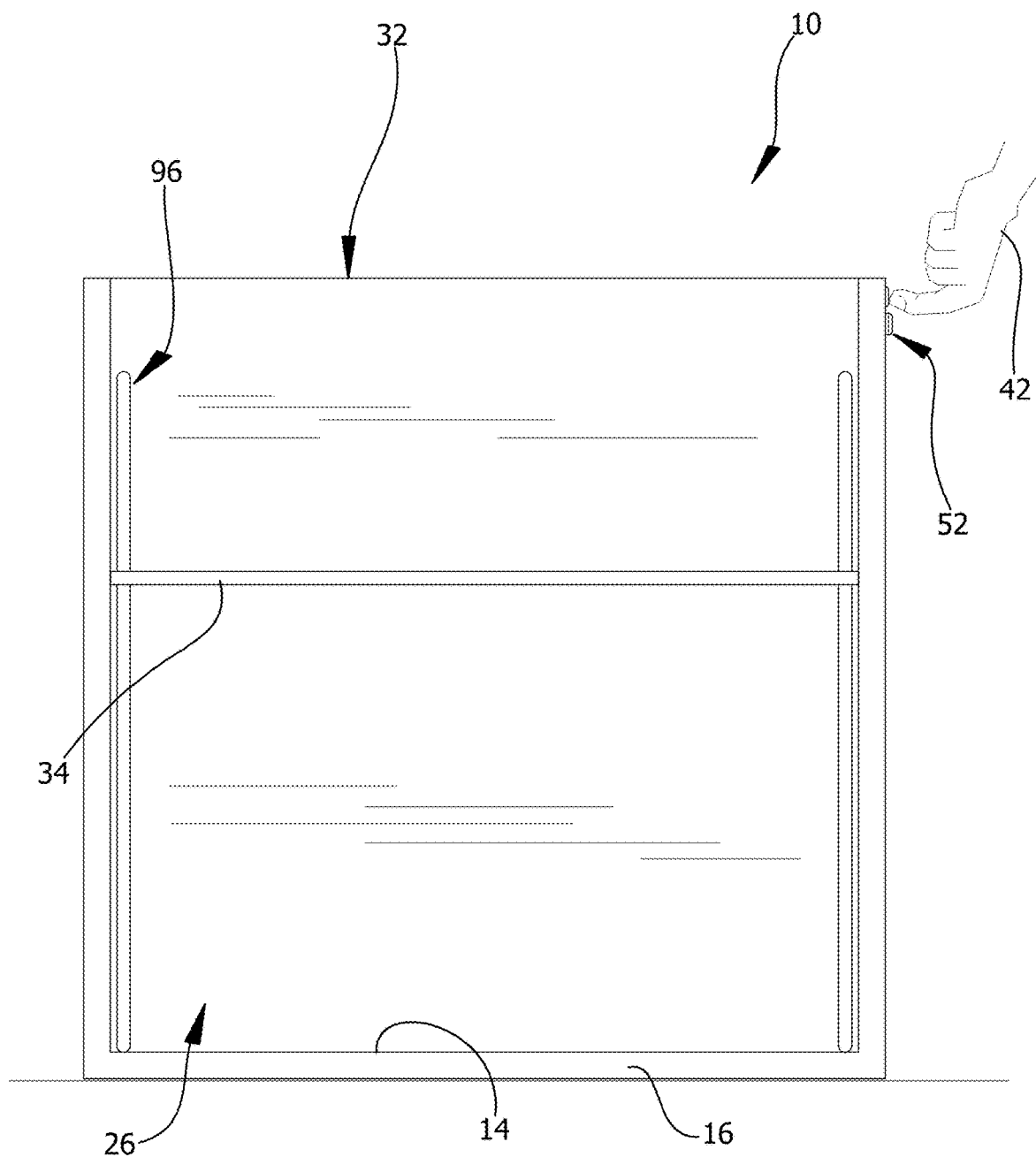
FIG. 3 is a front view of an embodiment of the disclosure.
Figure 4:
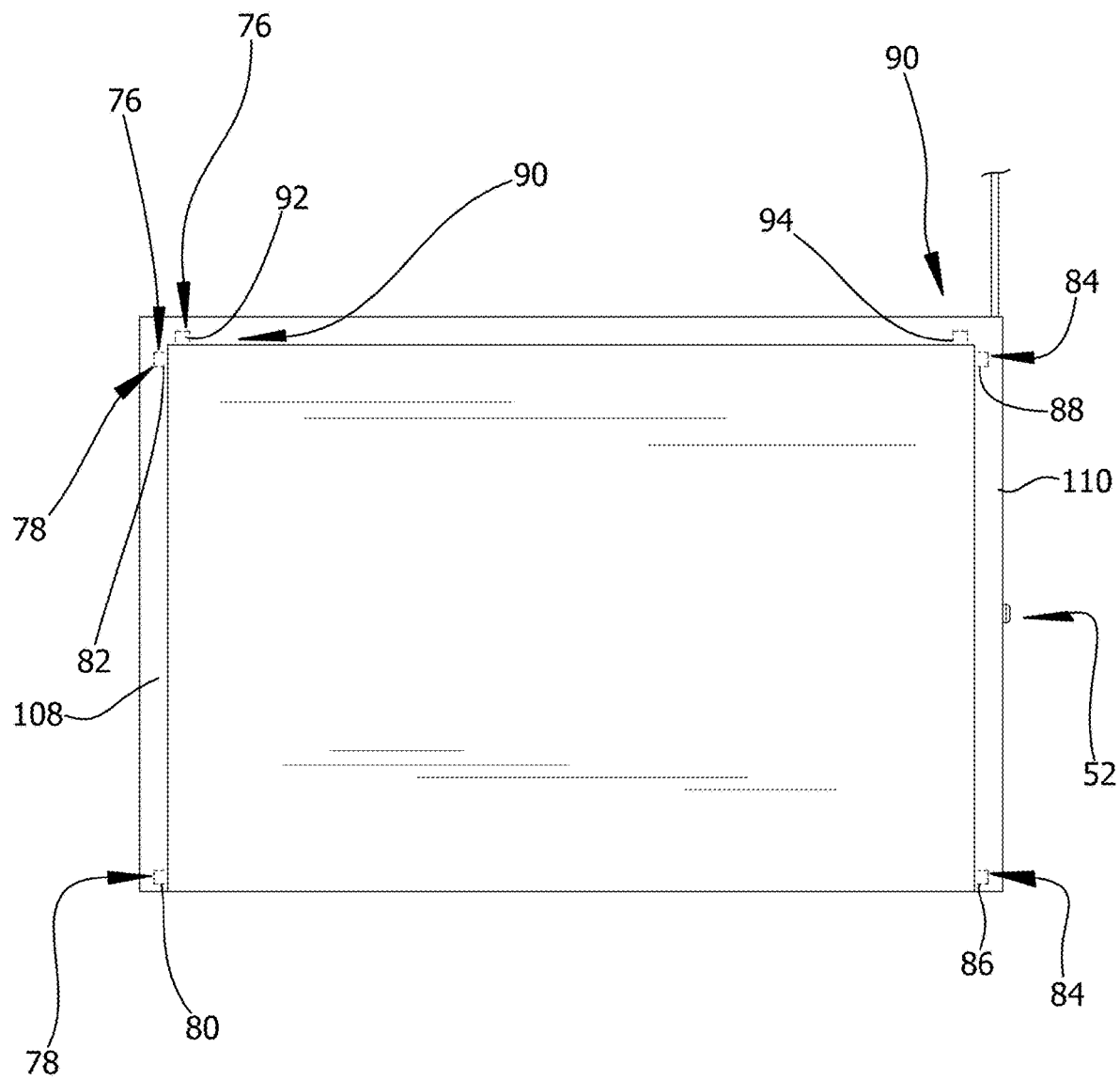
FIG. 4 is a top view of an embodiment of the disclosure.

In use, the user 42 can store the litter box 40 on the platform 34 within the inner area 28 of the enclosure 12. While the platform 34 is in the lowered position 36, the pet of the user 42 may access the litter box 40 through either the front opening 26 or the top opening 32. When the user 42 needs to clean, refill, or otherwise maintain the litter box 40, the user 42 can actuate the drive assembly 44 to move the platform 34 to the raised position 38. For example, the user 42 may press the up button 54 on the control panel 52, as shown in FIG. 3. While the platform 34 is in the raised position 38, the litter box 40 may be positioned at approximately waist level of the user 42, such that the user 42 does not need to bend over to the ground to maintain the litter box 40. FIG. 7 provides an exemplary embodiment, showing positioning of the litter box 40 when the platform 34 is at the raised position 38. The user 42 can reach through the top opening 32 to empty, clean, or refill the litter box 40. Then, the user 42 can press the down button 56 to actuate the drive assembly 44 and move the platform 34 down to the lowered position 36. When the motion sensor 106 detects movement beneath the platform 34, the processor 50 may halt the first motor 46 and the second motor 48, to inhibit the platform 34 from moving downward toward the base wall 14. The motion sensor 106 thus inhibits the platform 34 from causing injury as the platform 34 moves downward, for example if the pet enters the inner area 28 of the enclosure 12 through the front opening 26 while the platform 34 is in the raised position 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lift apparatus comprising:
an enclosure including:
a base wall;
a back wall being coupled to and extending upwardly from the base wall, the back wall having a back wall upper edge being distally positioned relative to the base wall;
a pair of side walls being coupled to and extending upwardly from the base wall, the pair of side walls being coupled to and extending forwardly from the back wall, each side wall of the pair of side walls having a respective side wall upper edge being distally positioned relative to the base wall;
the back wall upper edge and the respective side wall upper edge of each side wall of the pair of side walls defining a top opening into the enclosure;
a platform being movably coupled to the enclosure, the platform being selectively positionable between a lowered position and a raised position, the platform being positioned against the base wall when the platform is in the lowered position, the platform being positioned proximate to the top opening when the platform is in the raised position;
a drive assembly being coupled to the platform, the drive assembly being actuatable to move the platform between the lowered position and the raised position;
a guide being coupled to the enclosure, the platform being movably coupled to the guide wherein the guide inhibits the platform from being pivoted as the platform moves between the lowered position and the raised position, the guide including:
a plurality of fingers extending from the platform toward the enclosure; and
a plurality of channels extending into an inner surface of the enclosure, the plurality of channels being aligned with the plurality of fingers wherein each finger of the plurality of fingers is positioned within a respective channel of the plurality of channels, the plurality of fingers moving along the plurality of channels as the platform moves between the raised position and the lowered position.

2. The lift apparatus of claim 1, the drive assembly further comprising:
a first motor being coupled to a first side wall of the pair of side walls;
a second motor being spaced from the first motor;
a processor being electrically coupled to each of the first motor and the second motor, the processor being actuatable to actuate each of the first motor and the second motor;
a control panel being electrically coupled to the processor, the control panel being actuatable to signal the processor to actuate each of the first motor and the second motor; and
a plurality of pulleys being coupled to the first motor and the second motor, the plurality of pulleys being coupled to the platform, the first motor and the second motor moving the plurality of pulleys to move the platform between the lowered position and the raised position.

3. The lift apparatus of claim 2, the control panel further comprising:
an up button being actuatable to move the platform upwards toward the raised position; and a down button being actuatable to move the platform downwards toward the lowered position.

4. The lift apparatus of claim 2, the drive assembly further comprising an internal power source being electrically coupled to the processor.

5. The lift apparatus of claim 4, wherein the internal power source is electrically coupled to a power input, the power input being configured to be electrically couplable to an extrinsic power source wherein the power input is configured to transfer power from the extrinsic power source to the internal power source.

6. The lift apparatus of claim 2, the plurality of pulleys further comprising:
a first pulley being positioned within the first side wall proximate to the front opening;
a second pulley being positioned within a second side wall of the pair of side walls, the second pulley being positioned proximate to the back wall;
a third pulley being positioned within the second side wall proximate to the front opening; and
a fourth pulley being positioned within the first side wall proximate to the back wall.

7. The lift apparatus of claim 2, the plurality of pulleys further comprising:
a first pulley being positioned within the first side wall of the pair of side walls; and
a second pulley being spaced from the first pulley.

8. The lift apparatus of claim 2, further comprising a motion sensor being electrically coupled to the processor, the motion sensor being configured to detect movement beneath the platform when the platform is raised from the lowered position, the processor being configured to inhibit the platform from being moved downwardly toward the base wall when the motion sensor detects movement beneath the platform.

9. The lift apparatus of claim 1, each channel of the plurality of channels further comprising a respective top end, the respective top end of each channel of the plurality of channels being aligned with each other proximate to the top opening.

10. The lift apparatus of claim 9, wherein the respective top end of each channel of the plurality of channels is spaced from the top opening wherein the plurality of channels is configured to inhibit the platform from being removed from the enclosure through the top opening.

11. The lift apparatus of claim 1, wherein the plurality of fingers are coplanar with each other.

12. The lift apparatus of claim 1, the plurality of fingers further comprising:
a pair of first side fingers extending toward a first side wall of the pair of side walls;
a pair of second side fingers extending toward a second side wall of the pair of side walls; and
a pair of back fingers extending toward the back wall.

13. The lift apparatus of claim 12, wherein the pair of first side fingers are spaced from each other.

14. The lift apparatus of claim 13, wherein the pair of second side fingers are aligned with the pair of first side fingers across the platform.

15. The lift apparatus of claim 12, the pair of first side fingers further comprising:
a primary first side finger being positioned proximate to a respective forward edge of the first side wall; and
a secondary first side finger being positioned proximate to the back wall.

16. The lift apparatus of claim 12, the pair of second side fingers further comprising:

a primary second side finger being positioned proximate to a respective forward edge of the second side wall; and
a secondary second side finger being positioned proximate to the back wall.

17. The lift apparatus of claim 12, the pair of back fingers further comprising:
a primary back finger being positioned proximate to the first side wall; and
a secondary back finger being positioned proximate to the second side wall.

18. The lift apparatus of claim 1, the plurality of fingers further comprising:
a pair of side fingers extending toward a side wall of the pair of side walls; and
a pair of back fingers extending toward the back wall.

19. A lift apparatus comprising:
an enclosure including:
a base wall being planar, the base wall being rectangular, the base wall including a base wall forward edge;
a back wall being coupled to and extending upwardly from the base wall, the back wall being perpendicular to the base wall, the back wall being planar, the back wall being distally positioned on the base wall relative to the base wall forward edge, the back wall being rectangular, the back wall including a back wall upper edge being distally positioned relative to the base wall;
a pair of side walls being coupled to and extending upwardly from the base wall, the pair of side walls being perpendicular to the base wall, the pair of side walls being coupled to and extending forwardly from the back wall, the pair of side walls being perpendicular to the back wall, each side wall of the pair of side walls being planar, each side wall of the pair of side walls being rectangular, the pair of side walls including:
a pair of side wall forward edges, each side wall of the pair of side walls having a respective side wall forward edge of the pair of side wall forward edges, the pair of side wall forward edges being distally positioned relative to the back wall, the pair of side wall forward edges being coplanar with the base wall forward edge to define a front opening into the enclosure, the front opening being configured to facilitate access to an inner area of the enclosure; and
a pair of side wall upper edges, each side wall of the pair of side walls having a respective side wall upper edge of the pair of side wall upper edges, the pair of side wall upper edges being distally positioned relative to the base wall, the pair of side wall upper edges being coplanar with the back wall upper edge to define a top opening into the enclosure, the top opening being configured to facilitate access to the inner area of the enclosure;
a length between the pair of side wall forward edges being between 20.0 inches and 40.0 inches;
a height between the base wall and the back wall upper edge being between 20.0 inches and 40.0 inches; and
a width between the base wall forward edge and the back wall being between 10.0 inches and 30.0 inches;
a platform being movably coupled to the enclosure, the platform being selectively positionable between a lowered position and a raised position, the platform being positioned against the base wall when the platform is in the lowered position, the platform being positioned proximate to the top opening when the platform is in the raised position, the platform being planar, the platform being rectangular, the platform having a shape being complementary to a shape of the base wall wherein the platform is coextensive with the base wall, the platform covering the base wall when the platform is in the lowered position, the platform inhibiting access to the inner area of the enclosure through the top opening when the platform is in the raised position;

a drive assembly being coupled to the platform, the drive assembly being actuatable to move the platform between the lowered position and the raised position, the drive assembly including:
  a first motor being coupled to a first side wall of the pair of side walls, the first motor being positioned within the first side wall, the first motor being positioned proximate to the respective side wall forward edge of the first side wall wherein the first motor is positioned proximate to the front opening, the first motor being spaced from the base wall wherein the first motor is positioned proximate to the top opening;
  a second motor being spaced from the first motor wherein the second motor is configured to facilitate the first motor in moving the platform between the lowered position and the raised position, the second motor being coupled to a second side wall of the pair of side walls, the second motor being positioned within the second side wall, the second motor being positioned proximate to the back wall wherein the second motor is spaced from the front opening, the second motor being spaced from the base wall wherein the second motor is positioned proximate to the top opening;
  a processor being electrically coupled to each of the first motor and the second motor, the processor being actuatable to actuate each of the first motor and the second motor;
  a control panel being electrically coupled to the processor, the control panel being actuatable to signal the processor to actuate each of the first motor and the second motor, the control panel including:
    an up button being actuatable to move the platform upwards toward the raised position, the up button being positioned on an outer surface of the second side wall of the pair of side walls, the up button being positioned proximate to the respective side wall upper edge of the second side wall, the up button being spaced from the back wall, the up button being spaced from the respective side wall forward edge of the pair of side wall forward edges; and
    a down button being actuatable to move the platform downwards toward the lowered position, the down button being positioned beneath the up button, the down button being aligned with the up button;
  an internal power source being electrically coupled to the processor, the internal power source comprising a battery, the internal power source being electrically coupled to a power input, the power input being configured to be electrically couplable to an extrinsic power source wherein the power input is configured to transfer power from the extrinsic power source to the internal power source, the power input being a power cord extending from the back wall of the enclosure, the power cord being positioned proximate to the base wall, the power cord being positioned proximate to the second side wall; and
  a plurality of pulleys being coupled to the first motor and the second motor, the plurality of pulleys being coupled to the platform, the first motor and the second motor moving the plurality of pulleys to move the platform between the lowered position and the raised position, the plurality of pulleys including:
    a first pulley being positioned within the first side wall proximate to the front opening;
    a second pulley being positioned within the second side wall proximate to the back wall;
    a third pulley being positioned within the second side wall proximate to the front opening; and
    a fourth pulley being positioned within the first side wall proximate to the back wall;

a guide being coupled to the enclosure, the platform being movably coupled to the guide wherein the guide inhibits the platform from being pivoted as the platform moves between the lowered position and the raised position, the guide including:
  a plurality of fingers extending from the platform toward the enclosure, the plurality of fingers being coplanar with each other, the plurality of fingers including:
    a pair of first side fingers extending toward the first side wall of the pair of side walls, the pair of first side fingers being spaced from each other wherein a primary first side finger of the pair of first side fingers is positioned proximate to the respective forward edge of the first side wall and wherein a secondary first side finger of the pair of first side fingers is positioned proximate to the back wall;
    a pair of second side fingers extending toward the second side wall of the pair of side walls, the pair of second side fingers being aligned with the pair of first side fingers across the platform wherein a primary second side finger of the pair of second side fingers is positioned proximate to the respective forward edge of the second side wall and wherein a secondary second side finger of the pair of second side fingers is positioned proximate to the back wall, the pair of second side fingers being parallel to the pair of first side fingers; and
    a pair of back fingers extending toward the back wall, the pair of back fingers being spaced from each other wherein a primary back finger of the pair of back fingers is positioned proximate to the first side wall and wherein a secondary back finger of the pair of back fingers is positioned proximate to the second side wall, the pair of back fingers being perpendicular to the pair of first side fingers and the pair of second side fingers;
  a plurality of channels extending into an inner surface of the enclosure, the plurality of channels being aligned with the plurality of fingers wherein each finger of the plurality of fingers is positioned within a respective channel of the plurality of channels, each finger of the plurality of fingers sliding along the respective channel of the plurality of channels as the platform moves between the raised position and the lowered position, the plurality of channels having a uniform length wherein each channel of the plurality of channels has a respective top end being aligned with each other proximate to the top opening, the respective top end of each channel of the plurality of channels being spaced from the top opening wherein the plurality of channels is configured to inhibit the platform from being removed from the enclosure through the top opening, the plurality of channels including:
- a pair of first side channels extending into the first side wall;
- a pair of second side channels extending into the second side wall;
- a pair of back channels extending into the back wall; and a motion sensor being electrically coupled to the processor, the motion sensor being configured to detect movement beneath the platform when the platform is raised from the lowered position, the processor being configured to inhibit the platform from being moved downwardly toward the base wall when the motion sensor detects movement beneath the platform wherein the motion sensor is configured to inhibit the platform from injuring the user.

* * * * *